J. P. FRENCH & L. A. BOWLER.
Egg-Preservers.
No.147,628. Patented Feb. 17, 1874.
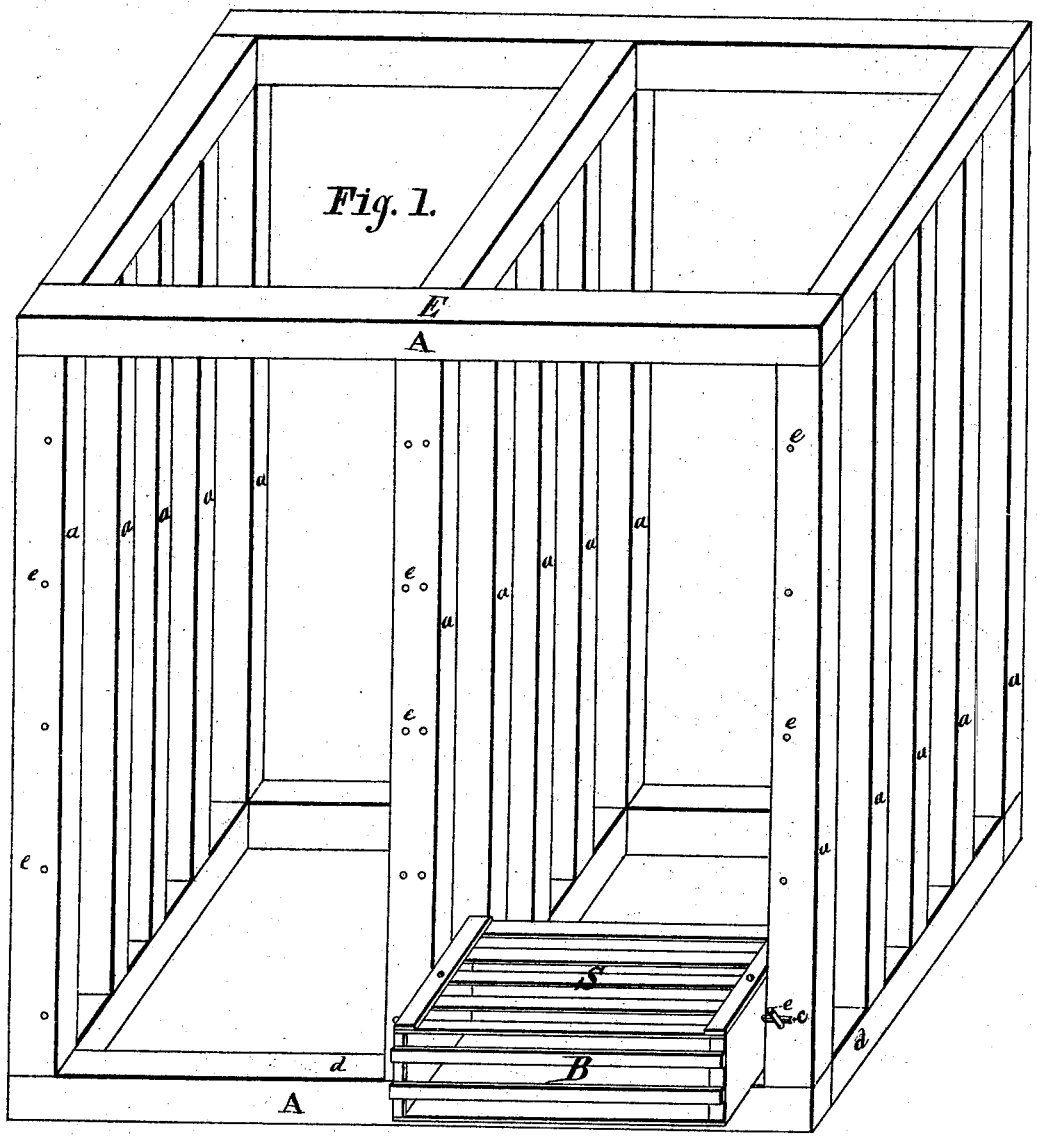
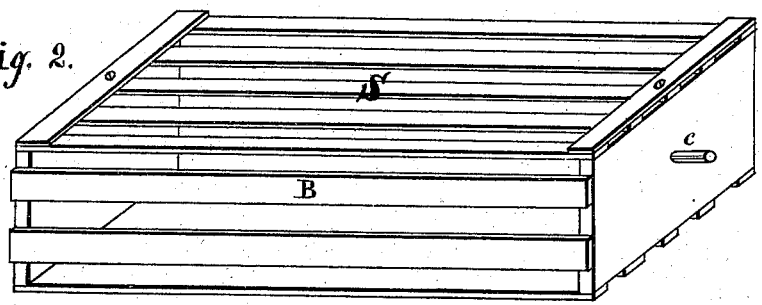

UNITED STATES PATENT OFFICE.

JOHN P. FRENCH AND LEANDER A. BOWLER, OF PALERMO, MAINE.

IMPROVEMENT IN EGG-PRESERVERS.

Specification forming part of Letters Patent No. 147,628, dated February 17, 1874; application filed October 15, 1873.

*To all whom it may concern:*

Be it known that we, JOHN P. FRENCH and LEANDER A. BOWLER, both of Palermo, county of Waldo and State of Maine, have invented a new and Improved Egg-Preserver; and we do declare the following is a clear and exact description of the same, reference being had to the accompanying drawing and letters of reference marked thereon, making a part of this specification, in which—

Figure 1 is a front view of frame and box; Fig. 2, view of box detached.

This invention relates to certain improved means for preserving eggs when packed in large quantities.

It is well known that the most common cause of the decay of eggs when packed for any considerable length of time, especially in warm weather, is the contact of the yolk with the shell, the yolk being heavier than the white and settling to the bottom of the egg when the latter is left long in one position. Our invention has for its object to provide means for preventing this decay by frequently changing the positions of the eggs; and to this end it consists in providing the packing-boxes for holding the eggs with axles or trunnions, and locating in a suitable frame-work, so as to be easily turned, thereby changing the positions of their contents.

To enable others skilled in the art to make and use our invention, we will proceed to describe its construction and mode of operation.

Similar letters in drawing refer to like parts.

A is the frame, consisting of joists or posts of suitable size and material, fastened or secured at the top into slots E E, and at the bottom by and into sills $d\ d$, the posts $a\ a\ a$ being placed at regular intervals apart, and have upon their sides pins or sockets $e\ e\ e$, to receive and hold axles $c\ c$ of the boxes containing the eggs. Thus $a\ a\ a\ a$ are the posts, $e\ e\ e$ the sockets. B is simply a common egg-box with slats instead of boards for its sides, with axles $c\ c$ in the ends of the box. A frame six by six feet will hold twenty-five hundred dozen eggs, making it desirable on account of its simplicity and compactness. Box B, when filled and properly packed, is placed in or hung upon the sockets or pins $e\ e\ e$ inside of the posts $a\ a$, and being so hung or secured the boxes are easily turned or revolved in their place, thereby changing the relative position of the eggs in the boxes, and thus preventing the yolk of the egg from coming in contact with the shell, and thereby preserving the egg pure and sweet. The frame is easily made or fastened together by common mortise-and-tenon work. The boxes are made of suitable end boards with narrow slats nailed upon the sides, with a narrow space between each slat to allow the air to enter, with cover S made similarly and firmly screwed or fastened upon one side. The eggs need only to be packed in dry straw in the boxes.

In this case the frame is six feet square and the boxes two and a half feet by fourteen inches, being the distance the posts are set apart, with pins or sockets inside of the posts to receive and hold the axles of the boxes $c\ c$.

Having thus fully described my invention, I claim—

1. A packing-box provided with axles or trunnions and adapted to be turned in suitable bearings, substantially as described, for the purpose specified.

2. The frame A, provided with adjustable bearings or pins $e$, in combination with packing-boxes B, having axles or trunnions $c$, all arranged and operated substantially as described.

JOHN P. FRENCH.
LEANDER A. BOWLER.

Witnesses:
W. SCOTT HILL,
C. A. LOMBARD.